(12) United States Patent
Casado Montero

(10) Patent No.: US 10,836,497 B2
(45) Date of Patent: Nov. 17, 2020

(54) AIR CONDITIONING SYSTEM

(71) Applicant: AIRBUS OPERATIONS S.L., Madrid (ES)

(72) Inventor: Carlos Casado Montero, Madrid (ES)

(73) Assignee: Airbus Operations S.L., Madrid (ES)

( * ) Notice: Subject to any disclaimer, the term of this patent is extended or adjusted under 35 U.S.C. 154(b) by 451 days.

(21) Appl. No.: 15/395,293

(22) Filed: Dec. 30, 2016

(65) Prior Publication Data
US 2017/0190428 A1    Jul. 6, 2017

(30) Foreign Application Priority Data

Dec. 30, 2015  (EP) .................................... 15382679

(51) Int. Cl.
| B64D 13/00 | (2006.01) |
| B64D 13/08 | (2006.01) |
| B64D 13/06 | (2006.01) |

(52) U.S. Cl.
CPC ............. B64D 13/08 (2013.01); B64D 13/06 (2013.01); *B64D 2013/0611* (2013.01); *B64D 2013/0618* (2013.01); *B64D 2013/0688* (2013.01); *Y02T 50/56* (2013.01)

(58) Field of Classification Search
CPC ........... B64D 13/08; B64D 2013/0603; B64D 2013/0611; B64D 2013/0688; B64F 1/362
USPC ......................................................... 454/76
See application file for complete search history.

(56) References Cited

U.S. PATENT DOCUMENTS

| 4,312,191 A | 1/1982 | Biagini |
| 6,568,203 B1 | 5/2003 | Leathers |
| 9,809,314 B2 * | 11/2017 | Bammann .......... B60H 1/00435 |
| 2010/0101251 A1 * | 4/2010 | Kelnhofer .............. B64D 13/06 62/133 |
| 2015/0024674 A1 * | 1/2015 | McGregor ............. A01G 13/08 454/258 |
| 2016/0320291 A1 * | 11/2016 | Najjar .................. G01N 17/008 |

FOREIGN PATENT DOCUMENTS

| EP | 1 247 739 | 10/2002 |
| EP | 1 424 282 | 6/2004 |
| EP | 2 947 012 | 11/2015 |

OTHER PUBLICATIONS

European Extended Search Report cited in European patent application No. 15382679.7, dated Apr. 22, 2016 (8 pages).
European Search Report cited in EP 15 382 679.7 dated Jun. 26, 2019, 6 pages.

* cited by examiner

*Primary Examiner* — Helena Kosanovic
(74) *Attorney, Agent, or Firm* — Nixon & Vanderhye P.C.

(57) ABSTRACT

Air conditioning system for a cabin 6 of an aircraft, the air conditioning system 1 including a pressurized air source 2, a ram air duct 3, an air amplifier 4 and a heat exchanger 5. The air amplifier 4 includes an inlet 41 for work air, a slot 42 suitable for letting the work air exit the air amplifier, and a main fluid zone 43. The inlet 41 is in fluid communication with the pressurized air source 2 and the slot 42 is arranged in fluid communication with the ram air duct 3, in such a way that the work air exiting from the slot 42 produces a suction effect in the ambient air in such a way that this ambient air flows along the ram air duct 3. The air amplifier 4 is arranged so that the ambient air is forced by the suction effect to pass from the inlet 51 to the outlet 52 of the cold side of the heat exchanger 5.

16 Claims, 2 Drawing Sheets

AIR CONDITIONING SYSTEM

RELATED APPLICATION

This application claims priority to European Patent Application No. EP15382679.7 filed Dec. 30, 2015, the entirety of which is incorporated by reference.

TECHNICAL FIELD OF THE INVENTION

The present invention is related to the field of aircraft systems, in particular to the field of air conditioning systems for a passenger cabin of an aircraft

BACKGROUND OF THE INVENTION

The passenger cabin of a modern passenger aircraft is air-conditioned usually both when the aircraft is flying and is on the ground. The aircraft's own air conditioning system provides conditioned air for the cabin. The aircraft air conditioning system is supplied with pressurized air which is taken, e.g., bled, from a compressor of an engine of the aircraft, the Auxiliary Power Unit APU compressor or by an external source.

This pressurized air passes through one or several heat exchangers which cool the air to a desired low temperature. The conditioned air is then properly treated and introduced in the cabin at the proper temperature and pressure.

In the state of the art, this kind of air conditioning system requires cooling air needed to reduce the temperature of the air obtained from the compressor, the APU and in the following air compression steps within the air conditioning system. This cooling air was usually obtained from the ambient air. However, in some conditions usually on ground, the ambient air speed is zero or almost zero. The ambient air speed is not sufficient to move the air along the heat exchanging system and reduce the temperature of the compressed or pressurized air. For this purpose, it is usual to install a fan, which is usually driven by the air conditioning system. However, the fan is a noise source when the aircraft is parked and the Environmental Control System ECS is running.

SUMMARY OF THE INVENTION

The present invention may be embodied as an aircraft air conditioning system for a cabin of an aircraft. The air conditioning system may comprise: i a pressurized air source which, when in an air operative mode, provides work air with a pressure higher than 60 kPa, and when in a ground mode provides work air with a pressure higher than 100 kPa; ii a ram air duct, in fluid connection with ambient air, comprising a first cross section where a boundary of the first cross section is defined; iii an air amplifier comprising an inlet for work air, a slot suitable for letting the work air exit the air amplifier, and a main fluid zone, the inlet being in fluid communication with the pressurized air source and the slot being arranged in fluid communication with the ram air duct, in such a way that the work air exiting from the slot produces a suction effect in the ambient air in such a way that ambient air flows along the ram air duct; iii an air distribution and control system, with an inlet and an outlet; iv a heat exchanger with a cold side and a hot side, the cold side comprising an inlet and an outlet and the hot side comprising an inlet and an outlet, wherein the air amplifier is arranged so that the ambient air is forced by the suction effect to pass from the inlet to the outlet of the cold side of the heat exchanger, and wherein the outlet of the hot side of the heat exchanger is suitable for being in fluid communication with one inlet of the air distribution and control system, at least one outlet of which is in turn in fluid communication with the cabin.

The air conditioning system may use the ambient air when the aircraft is on ground and the aircraft's speed may be zero or almost zero.

The air operative mode of the pressurized air source refers to the mode when the aircraft is in flight. The ground mode of the pressurized air source refers to a mode while the aircraft is on the ground and may include low altitude, slow speed flight conditions.

In a particular embodiment, the air amplifier is arranged in the first cross section of the ram air duct upstream the inlet of the cold side of the heat exchanger. This particular configuration of the air conditioning system provides a better efficiency in the operation of the air amplifier.

In a particular embodiment, the slot is arranged in the boundary of the first cross section.

In a particular embodiment, the slot is arranged at a certain distance from the boundary of the first cross section. This particular configuration of the air conditioning system allows air to enter the system both in the main fluid zone and outside the main fluid zone, thus improving the air feeding under certain conditions.

In a particular embodiment, the slot is continuous. In another particular embodiment, the slot comprises discontinuities.

In a particular embodiment, the air amplifier is arranged downstream the inlet of the cold side of the heat exchanger. In this particular configuration of the air conditioning system, the hot air used to operate the air amplifier is not mixed with the ambient air used to cool the work air, so the cooling power of the ambient air is greater.

In a particular embodiment, the pressurized air source is one of at least an APU or a bleed duct from one or several engine compressors. In other embodiments, the pressurized air source is an air compressor or comes from a pressurized air ground connection.

In a particular embodiment, the pressurized air source is also configured to provide air to the inlet of the hot side of the heat exchanger.

In a particular embodiment, the heat exchanger is comprised in an air cycling machine which further comprises at least a turbine, a compressor and a secondary heat exchanger.

In a second inventive aspect, the invention provides an aircraft comprising an air conditioning system according to any embodiment of the first inventive aspect.

DESCRIPTION OF THE DRAWINGS

These and other characteristics and advantages of the invention will be clearly understood in view of the detailed description of the invention and further in view of the preferred embodiments of the invention, with reference to the drawings. Preferred embodiments are given just as examples and are not intended to limit the scope of the present invention.

DETAILED DESCRIPTION OF THE INVENTION

Figure 1:
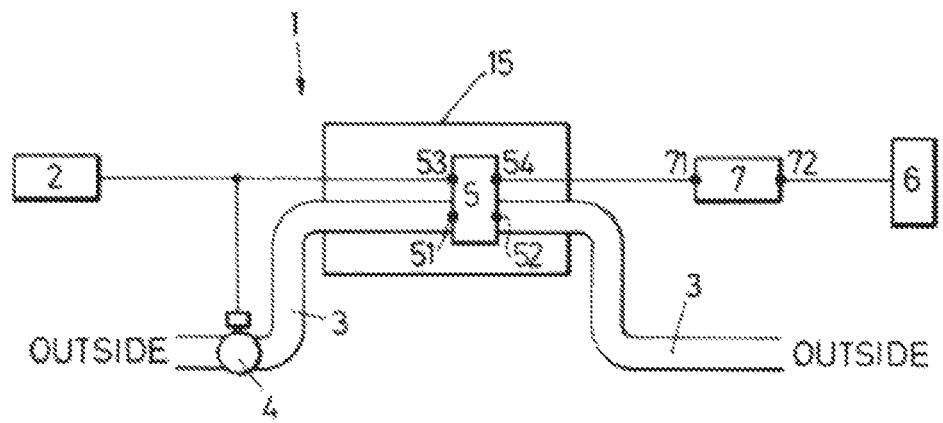
FIG. 1 shows schematically a first embodiment of an air conditioning system.

FIG. 1 shows a schematic view of a particular embodiment of an air conditioning system 1 for a cabin 6 of an aircraft. This air conditioning system 1 comprises: a pressurized air source 2; a ram air duct 3, in fluid connection with ambient air, comprising a first cross section where a boundary of the first cross section is defined; an air amplifier 4; an air distribution and control system 7, with an inlet 71 and an outlet 72; a heat exchanger 5 with a cold side and a hot side, the cold side comprising an inlet 51 and an outlet 52 and the hot side comprising an inlet 53 and an outlet 54, wherein the air amplifier 4 is arranged so that the ambient air is forced by the suction effect to pass from the inlet 51 to the outlet 52 of the cold side of the heat exchanger 5, and wherein the outlet 54 of the hot side of the heat exchanger 5 being suitable for being in fluid communication with the inlet 71 of the air distribution and control system 7, the outlet 72 of which is in turn in fluid communication with the cabin 6.

The pressurized air source 2 may be one of APU or a bleed duct from one or several engine compressors. In this way, pressurized air is obtained to operate the air conditioning system 1 of the invention. In other embodiments, the pressurized air source is an air compressor or comes from a pressurized air ground connection.

The pressurized air source 2 provides air which needs to be at a higher pressure than the ambient air, whatever ambient pressure is. When the aircraft is flying at a cruise altitude, the pressurized air source 2 is in air operative mode and provides work air with a pressure higher than 60 kPa. This pressure is enough to operate the air amplifier 4.

While the aircraft is on ground, ambient pressure is higher and thus work air is needed at a higher pressure. As a consequence, the pressurized air source 2, while in air ground mode, provides work air with a pressure higher than 100 kPa. While the aircraft is on the ground or at a low altitude and flying at a low speed, ambient air entering the ram air duct 3 may need a boost, such as an additional pressure difference, supplied by the air amplifier 4.

The pressurized air source 2 may be configured to provide air to the inlet 53 of the hot side of the heat exchanger 5. The heat exchanger 5 may be in an air cycling machine 15 which further comprises at least a turbine, a compressor and a secondary heat exchanger. The air amplifier 4 may be arranged in a first cross section of the ram air duct 3 upstream the inlet of the cold side of the heat exchanger.

Figures 2A, 2B:
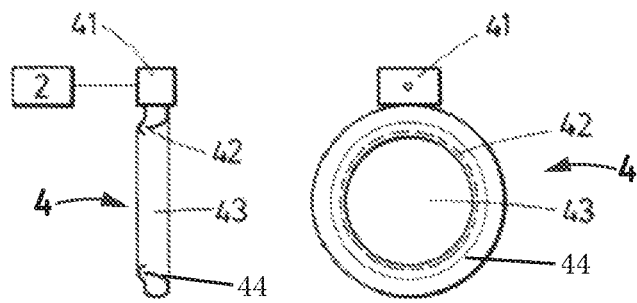
FIGS. 2A and 2B show a side view 2A and front view 2B of the air amplifier of an air conditioning system.

FIGS. 2A and 2B shows a side and front view, respectively, of the air amplifier 4. The air amplifier 4 may comprise an inlet 41 for work air, a slot 42 suitable for letting the work air exit the air amplifier, and a main fluid zone 43. The main fluid zone 43 may be an entire cross section of the ram air duct 3 or a sub-section of a cross section of the ram air duct 3. The inlet 41 is in fluid communication with the pressurized air source 2, thus receiving the work air from it, and the slot 42 which receives the work air exhausts this work air in the ram air duct 3.

The air amplifier 4 may be integral with the ram air duct or a separate device from the ram air duct that is mounted within a cross section of a flow passage in the ram air duct. The amplifier 4 may include a duct providing a flow path for work air from the inlet 41 to the slot 42. The duct may be an annular duct as shown in FIG. 2. The slot may be on a wetted surface of the duct of the amplifier, wherein the wetted surface is exposed to the airflow through the ram air duct. The slot may be arranged to project pressurized work air into the airflow through the ram air duct.

The slot 42 is arranged such that work air exiting from the slot 42 produces a suction effect in the ambient air in such a way that ambient air flows along the ram air duct 3. The suction effect is caused because the slot 42 makes the work air flow by a surface which accelerates it, and consequently makes its pressure lower. The lower pressure generates an under-pressure in the main fluid zone 43 which produces the suction effect in the ambient air, making it enter the ram air duct 3.

Figure 3:
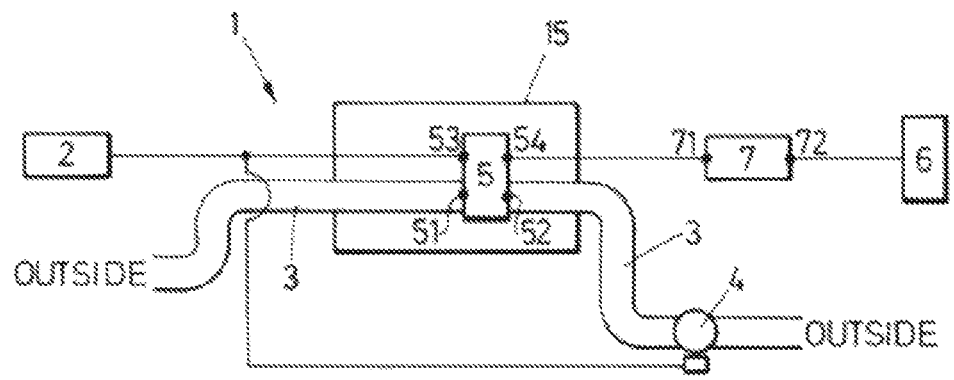
FIG. 3 shows schematically an alternative arrangement for an air conditioning system.

FIG. 3 shows a schematic view of an alternative arrangement for a particular embodiment of an air conditioning system 1 according to the invention. In this alternative arrangement, the air amplifier 4 is arranged downstream the inlet 51 of the cold side of the heat exchanger 5.

FIGS. 4A to 4D show different alternatives for the first cross section of the ram air duct. In each alternative, the slot 42 of the air amplifier is arranged in different ways at the first cross section of the ram air duct 3.

Figure 4A:
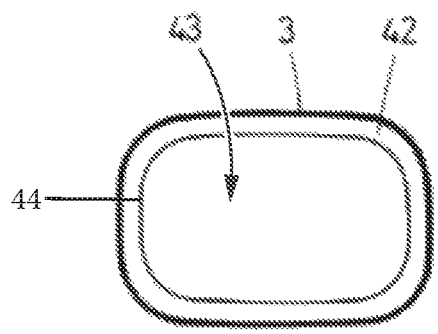
FIGS. 4A to 4D show alternatives for the first cross section of the ram air duct.

FIG. 4a shows the first cross section of the ram air duct, where the slot 42 is arranged in the boundary wall 44 of the first cross section. In such a configuration, the main fluid zone 43 is a closed area which substantially coincides with the area of the first cross section of the ram air duct 3.

Figure 4B:
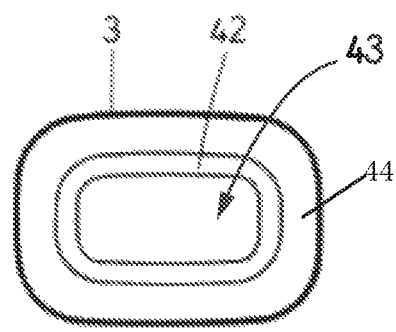

FIG. 4b shows the first cross section of the ram air duct, where the slot 42 is arranged at a certain distance from the boundary wall 44 of the first cross section. In such a configuration, the main fluid zone 43 is a closed area which is smaller than the area of the first cross section of the ram air duct 3.

Figure 4C:
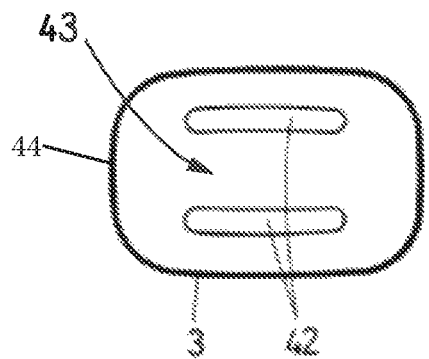
Figure 4D:
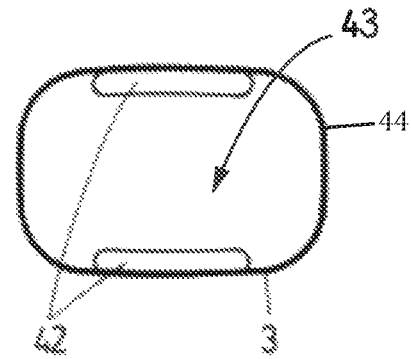

In these two embodiments, shown in FIGS. 4a-4b, the slot 42 is continuous. In FIGS. 4C and 4D, the slot 42 comprises discontinuities. FIG. 4C is similar to the one shown in FIG. 4b, but the slot 42 includes discontinuities. FIG. 4D is similar to FIG. 4A, but the slot 42 includes discontinuities.

While at least one exemplary embodiment of the present inventions is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An air conditioning system for a cabin of an aircraft, the air conditioning system comprising:
    a pressurized air source which is one of a bleed duct from an auxiliary power unit, a bleed duct from an engine compressor providing propulsion to the aircraft, an air compressor or a pressurized air ground connection, wherein, when in an air operative mode, the pressurized air source provides to an air amplifier work air with a pressure higher than 60 kPa and, when in a ground mode, provides work air with a pressure higher than 100 kPa;

a ram air duct in the aircraft and in fluid connection with ambient air outside of the aircraft, wherein the ram air duct includes a ram air inlet adjacent an external surface of the aircraft and a boundary wall defining a main fluid passage configured to receive the ambient air during both the air operative mode and the ground mode;

the air amplifier is in the aircraft and includes an inlet for the work air, a slot in the boundary wall of the ram air duct and configured to inject the work air into the main fluid passage of the ram air duct, wherein the inlet is in fluid communication with the pressurized air source to receive the work air from the pressurized air source, and the slot is configured to inject the work air into the main fluid passage of the ram air duct to draw the ambient air through the main fluid passage of the ram air duct;

an air distribution and control system, with an inlet and an outlet, wherein the outlet is in fluid communication with a cabin of the aircraft;

a heat exchanger with a cold side and a hot side, the cold side comprising an inlet and an outlet, and the hot side comprising an inlet and an outlet;

wherein the inlet and the outlet of the cold side of the heat exchanger are included in the main fluid passage of the ram air duct;

wherein the inlet of the hot side of the heat exchanger is in fluid communication with the pressurized air source and receives the work air from the pressurized air source, and the outlet of the hot side of the heat exchanger is in fluid communication with the inlet of the air distribution and control system.

2. The air conditioning system according to claim 1, wherein the slot of the air amplifier is aligned with a cross sectional plane of the ram air duct.

3. The air conditioning system according to claim 1, wherein the slot is a continuous slot extending the entirely around an opening defined by the boundary wall.

4. The air conditioning system according to claim 1, wherein the slot extends entirely around an opening defined by the boundary wall.

5. The air conditioning system according to claim 1, wherein the air amplifier is arranged downstream of the inlet of the cold side of the heat exchanger.

6. The air conditioning system according to claim 1, wherein the heat exchanger is comprised in an air cycling machine which further comprises at least a turbine, a compressor and a secondary heat exchanger.

7. A aircraft comprising an air conditioning system according to claim 1.

8. An aircraft air conditioning system for an aircraft comprising:

a pressurized air source configured to provide work air, wherein the pressurized air source is one of a bleed duct from an auxiliary power unit, a bleed duct from an engine compressor providing propulsion to the aircraft, a duct from an air compressor or duct from a pressurized air ground connection;

a ram air duct on the aircraft and in fluid connection with ambient air external to the aircraft, wherein the ram air duct includes a boundary wall defining a main fluid passage and the ram air duct includes a ram air inlet in an external surface of the aircraft;

an air amplifier on the aircraft, wherein the air amplifier includes an inlet receiving the work air from the pressurized air source and a slot configured to discharge the work air from the inlet into the ambient air duct, wherein the slot is in the boundary wall of the ram air duct, and a heat exchanger including a hot flow path having an upstream inlet in fluid communication with the pressurized air source to receive the work air from the pressurized air source and a downstream outlet in fluid communication with a cabin of the aircraft, and a cold flow path included in the main fluid passage of the ram air duct.

9. The aircraft air conditioning system of claim 8 wherein the slot is a continuous annular slot in the boundary wall of the ram air duct and the slot extends entirely around the main fluid passage of the ram air duct, wherein the slot is aligned with a plane extending through the boundary wall and perpendicular to an axis of the main fluid passage at the slot.

10. The aircraft air condition system of claim 9 wherein the slot is at or adjacent the boundary wall of the ram air duct.

11. The aircraft air conditioning system of claim 8 wherein the slot is a discontinuous slot extending entirely around the main fluid passage of the ram air duct.

12. An aircraft air conditioning system for an aircraft comprising:

a pressurized air duct connectable to a source of pressurized air, wherein the source of pressurized air is one of a bleed duct from an auxiliary power unit, a bleed duct from an engine compressor providing propulsion to the aircraft, and a duct from an air compressor, wherein the pressurized air source is configured to provide to an amplifier work air at a pressure of at least 60 kPa during flight of the aircraft and work air at a pressure of at least 100 kPa during ground operations of the aircraft;

a heat exchanger in the aircraft and including a cold flow path and a hot flow path separate from the cold flow path, wherein the hot flow path includes an upstream inlet in fluid communication with the source of pressurized air and a downstream outlet in fluid communication with a cabin of the aircraft, wherein the work air flows from the source of pressurized air, through the hot flow path in the heat exchanger and into the cabin;

a ram air duct in the aircraft including a boundary wall and the ram air duct includes:

the cold flow path of the heat exchanger;

a main flow passage of the ram air duct which is defined by the boundary wall;

a ram air inlet at an external surface of the aircraft and open to ambient air outside of the aircraft, and an outlet open to ambient air outside of the aircraft, and the air amplifier is in the ram air duct and includes an inlet coupled to the pressurized air duct and configured to receive the work air from the source of pressurized air, and the air amplifier further includes a slot in the boundary wall of the ram air duct, wherein the slot is configured to discharge the work air into the main flow passage.

13. The aircraft air conditioning system of claim 12 wherein the slot of the air amplifier is aligned with a plane passing through the main flow passage and perpendicular to a flow direction of ambient air flowing through the main flow passage.

14. The air conditioning system of claim 1, further comprising a first conduit extending from the pressurized air source to the inlet of the hot side of the heat exchanger, wherein the first conduit is configured to direct the work air from the pressurized air source to the hot side of the heat exchanger, and a second conduit including an inlet connected to the first conduit and a second inlet connected to the inlet for the air amplifier.

15. The aircraft air conditioning system of claim 8, further comprising a first conduit extending from the pressurized air source to the upstream inlet of the hot flow path in the heat exchanger, wherein the first conduit is configured to direct the work air from the pressurized air source to the hot flow path in the heat exchanger, and a second conduit includes an inlet connected to the first conduit and a second inlet connected to the inlet for the air amplifier.

16. The aircraft air conditioning system of claim 12, further comprising a first conduit extending from the source of pressurized air to the upstream inlet of the hot flow path in the heat exchanger, wherein the first conduit is configured to direct the work air from the pressurized air source to the hot flow path in the heat exchanger, and a second conduit includes an inlet connected to the first conduit and a second inlet connected to the inlet for the air amplifier.

\* \* \* \* \*